United States Patent [19]

Calderon

[11] 4,103,879

[45] Aug. 1, 1978

[54] APPARATUS FOR CONTROLLING EMISSIONS FROM OXYGEN STEELMAKING FURNACES

[76] Inventor: Albert Calderon, 1065 Melrose Dr., Bowling Green, Ohio 43402

[21] Appl. No.: 765,208

[22] Filed: Feb. 3, 1977

Related U.S. Application Data

[63] Continuation-in-part of Ser. No. 758,599, Jan. 12, 1977.

[51] Int. Cl.² ............................................. C21C 5/40
[52] U.S. Cl. ................................ 266/158; 294/81 R
[58] Field of Search .................... 75/60; 266/142, 143, 266/158; 122/7 A; 294/81 R, 81 SF

[56] References Cited

U.S. PATENT DOCUMENTS

| | | | |
|---|---|---|---|
| 3,863,906 | 2/1975 | Vicard | 266/158 |
| 3,899,205 | 8/1975 | Lanigan et al. | 294/81 SF |

*Primary Examiner*—Gerald A. Dost

[57] ABSTRACT

This disclosure proposes an improved method of and apparatus for collecting the fumes of a furnace but in particular of a steelmaking furnace using the basic oxygen blowing process which furnace rotates about a trunnion arrangement. Especially this disclosure applies to an improved fume collecting method for an oxygen steelmaking furnace whose emissions take place during the charging of scrap, during the charging of molten iron, during blowing oxygen in the furnace, and during the sample and temperature taking. This fume collection is accomplished by providing a hood of multiple purpose design adapted to collect the emissions during any of the aforementioned portions of the steelmaking cycle, which can be retro-fitted to existing steelmaking facilities.

7 Claims, 2 Drawing Figures

APPARATUS FOR CONTROLLING EMISSIONS FROM OXYGEN STEELMAKING FURNACES

This application is a continuation-in-part of application Ser. No. 758,599, filed Jan. 12, 1977.

The present invention relates to an improved method of and apparatus for collecting the fumes from a steelmaking furnace which is rotatable about an axis and known in the art as "Oxygen Steelmaking Furnace."

More particularly, this invention relates to an improved method and apparatus as applied to fume collection systems located over the mouth of a steelmaking furnace which is now in use in great numbers.

In the art of steelmaking, the oxygen steelmaking furnace is generally serviced by charging the scrap and molten iron, by blowing oxygen on the charge, the taking of temperature and samples and the tapping of the steel and slag.

During the charging of the scrap, the charging of molten iron, the blowing of oxygen and, the sample and temperature taking, a very serious pollution problem occurs. To correct this problem a hood is provided over the mouth of the furnace to collect the emissions. The collection of the emissions during blowing has been determined as successful by government authorities; however, the control of emissions during the charging of scrap and particularly during the charging of molten iron has not been satisfactory because great quantities of fumes and dirty flames are ejected from the mouth of the furnace into the building, and some fumes escape to the atmosphere. These polluting conditions cannot be withdrawn into the conventional hood whether it is of the open or closed type because the furnace is in its reclined position and the mouth thereof is not in registry with the point of entry of the hood. The hood is efficient in withdrawing emissions when the furnace is in its upright position but not in its reclined position to take the charge. In new installations auxilliary and canopy hoods attached to a bag-house, have been provided to catch these fugitive emissions at a cost of many millions of dollars in capital as well as operating costs, but despite these costs, no satisfactory solution has been found to retro-fit existing facilities which number around 25 to 30 steel plants in this country.

Attempts have been made to provide a sliding gate below the mouth of the hood, running on a track situated in the furnace aisle in order to constrict the mouth opening of the hood and increase the negative pressure of the hood towards the charging floor. This arrangement has not worked out well because of the position of the reclined furnace, the volume of the gas, the nonenvelopment of the iron ladle and the direction of the gases bellowing from the mouth of the furnace and the iron ladle.

The present invention is to eliminate the great expenditures needed for auxillary and canopy hooding but particularly this invention is suited for retro-fitting existing facilities to solve the pollution problems taking place not only during the blowing part as well as during the charging, temperature and sample taking, and slagging portion of the cycle and its main objective is to provide an effective pollution control system to a rotatable furnace so that the fumes are collected when the furnace is reclined as well as when the furnace is upright.

Another object of this invention is to provide pollution control for an oxygen steelmaking furnace comprising a special hood with features constructed thereto so that emissions are controlled during charging and during blowing.

Further another object of this invention is to provide a combination hood having a centralized portion for blowing and a side extension towards the charging aisle to collect emissions during charging, said hood being equipped with gate means to selectively control the suction of gases from the central portion which is used during the blowing and the suction from the extending portion which is used during the charging, sample taking and slagging.

Still another object of this invention is to make possible the registry of the mouth of the furnace with a first hood extension protruding towards the charging aisle of the steelmaking shop with gate means to block the entry of the hood portion used during blowing and make possible to cause an induced draft to pull the gases from the charging aisle during the charging of the scrap and the molten iron.

Yet another object of this invention is to provide a second hood extension protruding towards the charging aisle being preferably made-up of three sections and pivotally mounted in such a way as to form two sides to swing open away from said charging aisle for clearance purposes and one top, said sides being mounted to said first hood extension and said top being mounted on the main hoist spreader-beam of the crane doing the charging.

It is another object of the present invention to provide the said combination hood with a moveable skirt in order to minimize air infiltration into the central portion during blowing.

It is still another object of the present invention to provide a combination hood to take care of emissions during charging and blowing with gate means for selecting the direction of suction, said combination having an extension protruding towards the charging aisle adapted to envelope the ladle during the charging of molten iron, the charging of scrap, the sample and temperature taking and the slagging.

It is yet another object of the instant invention to provide means for controlling the intake of the gases selectively depending upon the particular portion of the cycle such as charging and blowing and sample taking by gate means to control the draft, by the envelopment of the molten iron ladle and the charging chute.

It is further yet another object of this invention to provide gate means which are water cooled to selectively cause suction from a plurality of furnace mouth positions, said gate means being operated by external actuating means in order to eliminate the causing of damage thereto and the provision of a tilting cover plate to form the top for said hood extension.

Other objects of this invention will appear in the following description and appended claims. Reference is made to the accompanying drawings forming a part of this specification and wherein reference characters designate corresponding parts in the several views.

Before exploring the present invention in detail, it is to be understood that the instant invention is not limited in its application to the details of construction and the arrangement of parts illustrated in the accompanying drawings since the invention is capable of other embodiments and of being practiced or carried out in various ways. Also it is to be understood that the phraseology or terminology employed herein is for the purpose of description and not limitation.

DETAILED DESCRIPTION OF DRAWINGS

Figure 2:
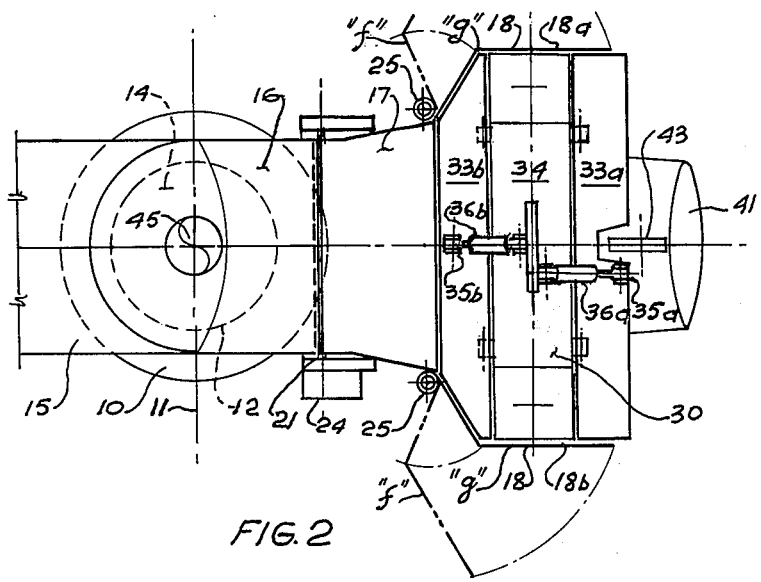
FIG. 2 is a sectional plan view taken at 2—2 of FIG. 1.
Figure 1:
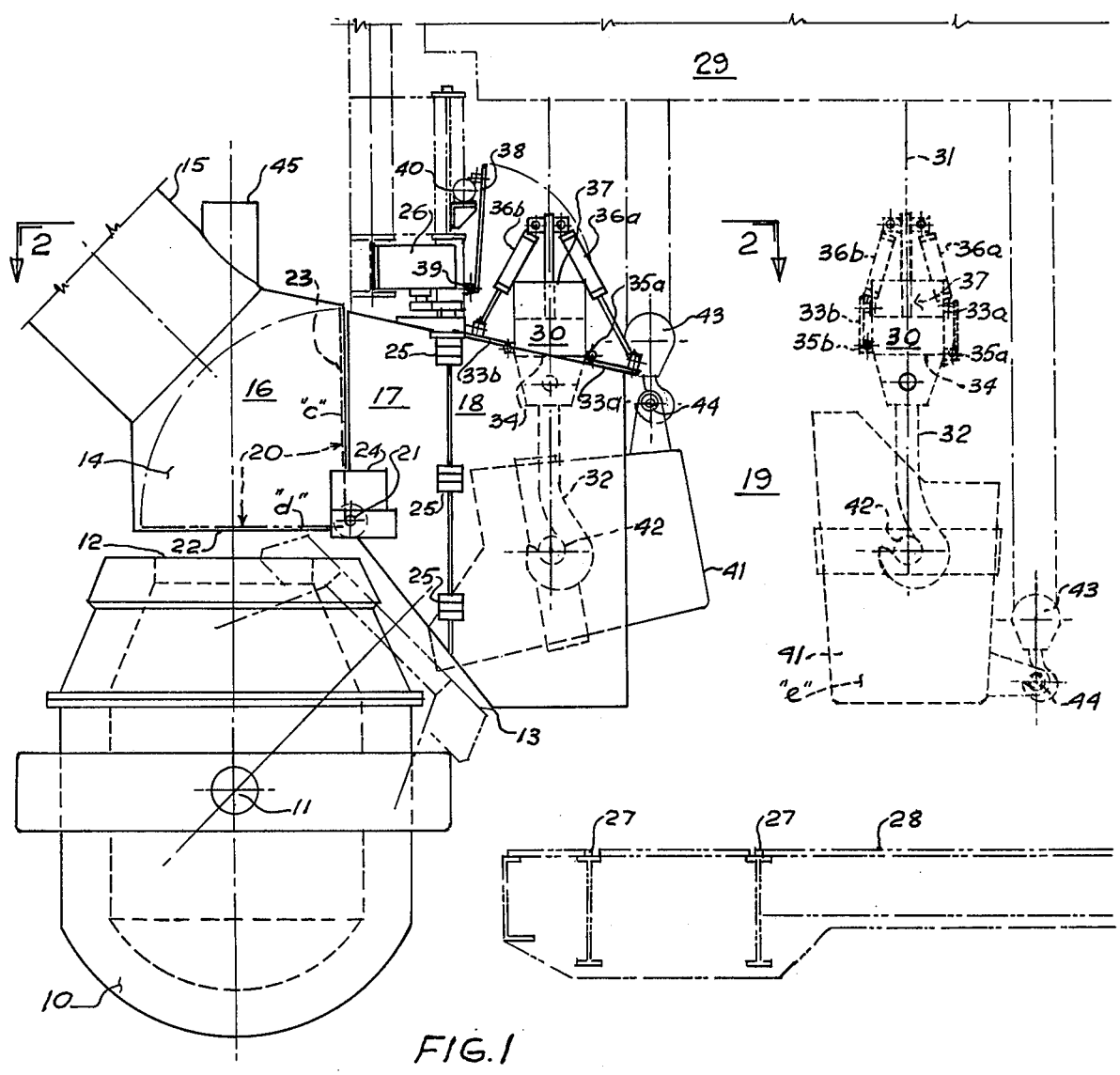
FIG. 1 shows a partial view taken cross-sectionally through a steelmaking shop using the basic oxygen steelmaking system. The furnace is shown in its entirety in solid in the upright position and in part in phantom in the reclined position, the reclined position being for charging and the upright position for blowing; the invention is shown in solid with the pivoted sections of the hood extension closed to indicate the envelopment of the ladle during the charging of molten iron.

In FIGS. 1 and 2, 10 indicates the basic oxygen furnace which possesses axis 11 about which it rotates; it also possesses drives to rotate it which drives are not shown in the drawing and which do not form a part of this invention. Furnace 10 which is refractory lined has mouth 12 and it is through this mouth that materials are charged such as scrap and molten iron; fumes and gases leave furnace 10 through mouth 12 during blowing. It is imperative to collect emissions from furnaces 10 at all times but particularly to collect the emissions during the charging of scrap and molten iron while it is in reclined position 13. Hood 14 above furnace 10 is provided for the collection of emissions and it is tied to dust collection system (not shown) by means of interconnecting duct 15. Since mouth 12 is not in registry with hood 14 when furnace 10 is in the reclined position it is vital to provide effective suctions during such reclination. Therefore, hood 14 is made-up of a first section 16, a second section 17, a third section 18 which in turn consists of two parts, 18-a and 18-b, and a fourth section to be described hereinafter. Section 16 which is fixed, is located overhead mouth 12 while furnace 10 is in the upright position. Section 17 which is also fixed, extends towards charging aisle 19. Gate 20 is interposed between Sections 16 and 17 and is mounted on axis 21, and gate 20 is preferably rotated from the vertical position (shown in dotted) to the horizontal position shown in phantom so that to selectively open or close openings 22 or 23, opening 22 being located over mouth 12 when furnace 10 is in the upright position and opening 23 being located between sections 16 and 17. In rotating gate 20 from the vertical position to the horizontal position, suction is changed from over furnace 10 when it is in the upright position to section 17 when furnace 10 is in the reclined position without loss of pressure drop. Drive 24 located exteriorally of hood 14 effects the rotation of gate 20. Section 18 having parts 18-a and 18-b are preferably pivotally mounted to sections 17 by means of pivots 25 in order to rotate parts 18-a and 18-b towards and away from charging aisle 19, this rotation being effected by drive 26. Section 18 is shown in the open position in phantom by FIG. 2, to provide clearance along the length of aisle 19 for charging equipment such as scrap charging equipment (not shown) which runs on rails 27 which rails are embedded in charging floor 28. Crane 29, shown in solid, is used for charging of molten iron and sometimes for scrap.

Crane 29 possesses spreader-beam 30 which is of special design. Spreader-beam 30 which is suspended from crane 29 by cables 31 and which carries hooks 32, has cover plate means 33, preferably two, 33-a and 33-b; these cover plates in co-operation with bottom 34 of spreader 30 jointly form a surface in order to cover the space spanned between part 18-a and 18-b of third section 18. For clearances and visibility, it is preferred to make cover plates 33-a and 33-b articulate and be pivotally mounted on axis 35-a and 35-b and actuated by actuators 36-a and 36-b; power pack 37 is also preferably mounted on spreader-beam 30. Auxilliary cover 38 to cover third section 18, is provided for use when collecting emissions without the presence of crane 29; cover 38 which is pivotally mounted at 39 is raised and lowered by cable means wound around drum-hoist 40. Hooks 32 of crane 29 engage ladle 41 at trunions 42 and auxilliary hoist 43 does the tipping of ladle 41 for charging molten iron by engagement with pivot 44.

While the operation of the method and apparatus of the present invention may be comprehended from a study of the foregoing description it is believed that the operation may be further explained as hereinafter set forth:

OPERATION

In operation the functions are explained as follows: Assuming that furnace 10 is empty and is in reclined position 13 in preparation for receiving the charge, scrap charging machine (not shown) filled with scrap travels from its parked position (not shown) to furnace 10 so its chute (not shown) is aligned with mouth 12. Gate 20 is lowered to horizontal position "d" from vertical position "c," and auxilliary cover 38 is lowered towards charging aisle 19 and parts 18-a and 18-b of extension 18 are rotated from position "f" shown in phantom to position "g" shown in solid in FIG. 2. In this manner suction is diverted from opening 22 to opening 23 of hood 14 and a negative draft is maintained within sections 16, 17 and 18 of hood 14. During the charging of the scrap gases are pulled from the envelope formed by sections 17 and 18 and cover 38 into interconnecting duct 15 and thence to the scrubber (not shown) for the treatment of the gas. At the conclusion of the scrap charging, parts 18-a and 18-b are rotated towards the furnace aisle back to position "f" and cover 38 raised in order to open the envelope and permit the scrap charger (not shown) to move back to its parked position.

At this time crane 29 moves ladle 41 from position "e" (shown in dotted lines) towards furnace 10 which is still in its reclined position 13, and cover plates 33-a and 33-b on spreader-beam 30, are lowered by the actuation of actuators 36-a and 36-b respectively to form a top cover. When ladle 41 reaches the end of its transversal travel towards furnace 10, parts 18-a and 18-b of extension 18 are swung again towards charging aisle 19 from position "f" to position "g," to form an envelope around ladle 41. Ladle 41 is then tipped by tipping mechanism 44 raising auxilliary hoist 43 so molten metal is poured into furnace 10 which is still in its reclined position, through mouth 12. Gate 20 is kept in position "d" so that suction in the envelope formed by sections 17 and 18 and spreader-beam 30, is not diminished but is maintained, and the gases emanating from the mouth of the furnace in the reclined position, and the open top of ladle 41 are sucked into interconnection 15 efficiently without loss of pressure from entry point 22 of hood 14, because of gate 20 closing this entry point which is only used during the blowing part of the cycle. At the conclusion of the molten iron charging, gate 20 is returned from "d" position to "c" position and furnace 10 is rotated upright so that mouth 12 is under section 16 with entry point 22 open and entry point 23 closed. An oxygen lance (not shown), is lowered into furnace 10 through hood entry point 45 and the blowing part of the cycle is initiated. Ladle 41 is returned from its tipped position to the upright position and moved away from furnace 10 as soon as parts 18-*a* and 18-*b* of hood extension 18 are swung open from position "*g*" to position "*f*."

At the conclusion of the blowing part of the cycle, furnace 10 is moved back to its reclined position for sample and temperature taking and for slagging. At this juncture gate 20 is moved from position "*c*" to "*d*," cover plate 38 is lowered and parts 18-*a* and 18-*b* of hood extension 18 are closed so that emissions escaping from mouth 12 of furnace 10 in the reclined position are also effectively sucked into section 15 even though furnace 10 is in its reclined position. It is to be noted that an adaptation to this invention may be incorporated to also suck the gases during tapping by providing a second gate similar to 20 on the furnace side opposite the charging aisle with hood extension similar to 17 and 18 which could collect emissions during tapping. It is also envisioned to drop side skirts to sections 16 and 17 all the way to the ground in order to collect emissions from slagging.

Further in new installations the position of rails 27 may be located at such a distance on the charging floor as to obviate the necessity of making section 18 in parts and not need the feature of pivot mounting to result in sections 17 and 18 in one composite structure.

All in all it is submitted that the present invention provides a new and novel method and apparatus for controlling emissions from rotatable steelmaking furnaces. While preferred embodiments of the present invention have been illustrated and described in considerable detail, the invention is not to be considered limited to the precise mode of construction shown. It is intended to cover hereby all adaptions, modifications and use of the invention which come within the scope of the appended claims.

I claim:

1. In the controlling of emissions from a basic oxygen steelmaking furnace an improved apparatus comprising in combination the following:
    (a) an overhead hood having an entry point located over the mouth of said furnace when said furnace is in its upright position,
    (b) suction means to create a negative pressure within said hood,
    (c) an extension means to said hood to protrude away from the axis of rotation of said furnace in such a way as to communicate with said hood by means of an aperture, said extension being positioned over the mouth of said furnace when said furnace is in the reclined position towards the charging aisle, and said extension having the top thereof removeable for access purposes, and
    (d) gate means to selectively control the emission of gases from either said entry point of said hood or said aperture of said extension.

2. The apparatus as set forth in claim 1 wherein said gate means is pivotally mounted to co-act with a drive means to effect the control for the admission of said gases.

3. The apparatus as set forth in claim 1 wherein said extension includes two sides and a cover to form the envelope for charging equipment in order to confine the gases created during charging and the suction of said gases through said aperture and into said hood.

4. The apparatus as set forth in claim 3 wherein said cover is pivotally mounted for opening and closing the top of said extension.

5. The apparatus as set forth in claim 3 wherein the cover of said extension is made an integral part of the spreader of the charging crane used which spreader supports the hooks of said crane.

6. The apparatus as set forth in claim 5 wherein said cover is made in sections.

7. The apparatus as set forth in claim 6 wherein the sections of said cover comprise a plurality of articulated parts to fold in when not charging and to fold out during charging.

* * * * *